United States Patent
Kirsch

(10) Patent No.: US 9,330,684 B1
(45) Date of Patent: May 3, 2016

(54) REAL-TIME WIND BUFFET NOISE DETECTION

(71) Applicant: Continental Automotive Systems, Inc., Auburn Hills, MI (US)

(72) Inventor: Matthew Kirsch, Chicago, IL (US)

(73) Assignee: Continental Automotive Systems, INC., Auburn Hills, MI (US)

( * ) Notice: Subject to any disclaimer, the term of this patent is extended or adjusted under 35 U.S.C. 154(b) by 0 days.

(21) Appl. No.: 14/670,887

(22) Filed: Mar. 27, 2015

(51) Int. Cl.
G10L 15/20 (2006.01)
G10L 25/84 (2013.01)
G10L 25/78 (2013.01)
G10L 21/00 (2013.01)

(52) U.S. Cl.
CPC .................. *G10L 25/84* (2013.01); *G10L 15/20* (2013.01); *G10L 25/78* (2013.01)

(58) Field of Classification Search
CPC ......... G10L 25/84; G10L 15/20; G10L 25/78; G10L 21/02; G10L 21/0208; G10L 21/0216
USPC .................. 704/205, 206, 214, 226, 233, 268
See application file for complete search history.

(56) References Cited

U.S. PATENT DOCUMENTS

2012/0121100 A1   5/2012   Zhang et al.
2012/0191447 A1   7/2012   Joshi et al.

FOREIGN PATENT DOCUMENTS

WO      2013/164029 A1    11/2013

OTHER PUBLICATIONS

Israel Cohen, "Noise Estimation in Adverse Environments: Improved Minima Controlled Recursive Averaging", IEEE Transactions on Speech and Audio Processing, Sep. 2003, pp. 466-475, vol. 11, No. 5.
Search Report dated Oct. 15, 2015, from corresponding GB Patent Application No. GB1507248.1.

*Primary Examiner* — Thierry L Pham

(57) ABSTRACT

Wind buffet noise in a microphone signal is detected using a per-frequency probability of speech estimate as well as short-term and long-term low-frequency energy. Using the probability of speech presence estimate, the buffet-no-speech condition can be accurately detected. But the probability of speech presence, by itself, is insufficient for distinguishing between the buffet-speech and either of the no-buffet conditions. It can be assumed that, if wind buffeting is occurring, it is occurring during both speech and non-speech segments to help distinguish between the other possible states. That is, the probability difference may be used as the criteria for entering the buffet-no-speech state, and then some other information (e.g., low frequency energy) may be used to determine when to transition to the buffet-speech state or one of the no-buffet states once the probability difference criteria is no longer met.

21 Claims, 3 Drawing Sheets

REAL-TIME WIND BUFFET NOISE DETECTION

BACKGROUND

Hands-free audio systems in automobiles can be used without the use of hands (for example via voice commands) or, in a wider sense, with relatively limited use of hands such that a telephone handset does not need to be held in the driver's hand while the driver is driving an automobile.

Automotive hands-free audio systems commonly use one or more of the vehicle's speakers to transmit the voice of the person on the other end of the telephone call, and one or more microphones in the vehicle to capture the driver's and/or passengers' voices during telephone calls.

A mobile phone is commonly connected to an automotive audio system head unit or a telematics unit in the vehicle via Bluetooth. Or the head unit or telematics unit could have its own network access device (NAD). In such a system, as the microphone signal goes through the system, the signal is processed and sent to the person on the other end through the mobile phone or NAD. The speech from the far end is coming through the phone (through the Bluetooth) or NAD, being processed, and then comes out of the speakers.

At the microphone in the vehicle, there could be near end speech, background noise, wind noise, and echo, which is the audio coming from the audio-system speakers and which is also being picked up by the microphone. When the person on the far end is speaking, that person doesn't want to hear their echo, the road noise, or the wind noise. So, the echo is typically cancelled, the road noise is typically suppressed, which are common features, but improved techniques for identifying wind buffet noise so that the wind buffet noise can be more aggressively suppressed when it is present would improve the sound quality at the far end of telephone conversations in which an automotive hands free audio system is being used.

BRIEF SUMMARY

In accordance with embodiments of the invention, wind buffet noise in a microphone signal is detected using a per-frequency probability of speech estimate as well as short-term and long-term low-frequency energy. Using the probability of speech presence estimate, the buffet-no-speech condition can be accurately detected. But the probability of speech presence, by itself, is insufficient for distinguishing between the buffet-speech and either of the no-buffet conditions. It can be assumed that, if wind buffeting is occurring, it is occurring during both speech and non-speech segments to help distinguish between the other possible states. That is, the probability difference may be used as the criteria for entering the buffet-no-speech state, and then some other information (e.g., low frequency energy) may be used to determine when to transition to the buffet-speech state or one of the no-buffet states once the probability difference criteria is no longer met.

DETAILED DESCRIPTION

Wind buffet noise may come from various situations in an automobile, including, but not limited to: a sun roof that is tilted open, one or more windows open, an HVAC fan is on a high setting and pointed toward the microphone, and the like. Wind buffet noise is essentially bursts of air hitting the microphone. The buffeting sounds like a low-pitched rumbling noise that, at times, comes and goes.

Wind buffet noise is generally localized in the low frequency range, for example, between about 0-600 Hz. But speech is also in that range. So, it is an interesting problem to try to detect wind buffet noise and then remove it. In standard narrow band telephony, speech is in the range of 0-4 kHz. The sampling rate is 8 kHz. Broadband speech can go up to 8 kHz. Speech itself can go higher than that. Due to the characteristics of the microphone and some up front processing, frequencies below about 50-100 Hz are typically removed or significantly attenuated.

Wind buffet noise is a serious problem for hands-free communication in an automotive environment. This type of noise often masks desired speech sounds, and due to the non-stationary characteristics of the noise, conventional noise suppression techniques are not effective. This results in the uplink speech being unintelligible at the far end of the communication.

Typically, in an automotive environment, there's background noise. The noise tends to be fairly stationary, which means that it's not changing. For example, the noise associated with passing a truck would be referred to as a transient noise because it comes and goes relatively quickly. Traditional noise suppression technologies typically won't remove that noise because such technologies work on noise that is assumed to be stationary for a particular time frame. Wind buffet noise is non-stationary, but typically more prolonged and localized in frequency.

Wind buffet noise makes speech unintelligible because, although it is low frequency, it tends to be higher energy than the speech in the lower frequencies where speech and wind buffet noise overlap.

In accordance with embodiments of the invention, wind buffet noise in a microphone signal is detected using a per-frequency probability of speech estimate as well as short-term and long-term low-frequency energy.

A variety of information may be used, including a per-frequency probability of speech presence, the low-frequency short-term energy, and the low-frequency long-term energy, to classify each input frame of the microphone signal into one of four possible states: buffet-no-speech; buffet-speech; no-buffet-no-speech; and no-buffet-speech.

Figure 1:
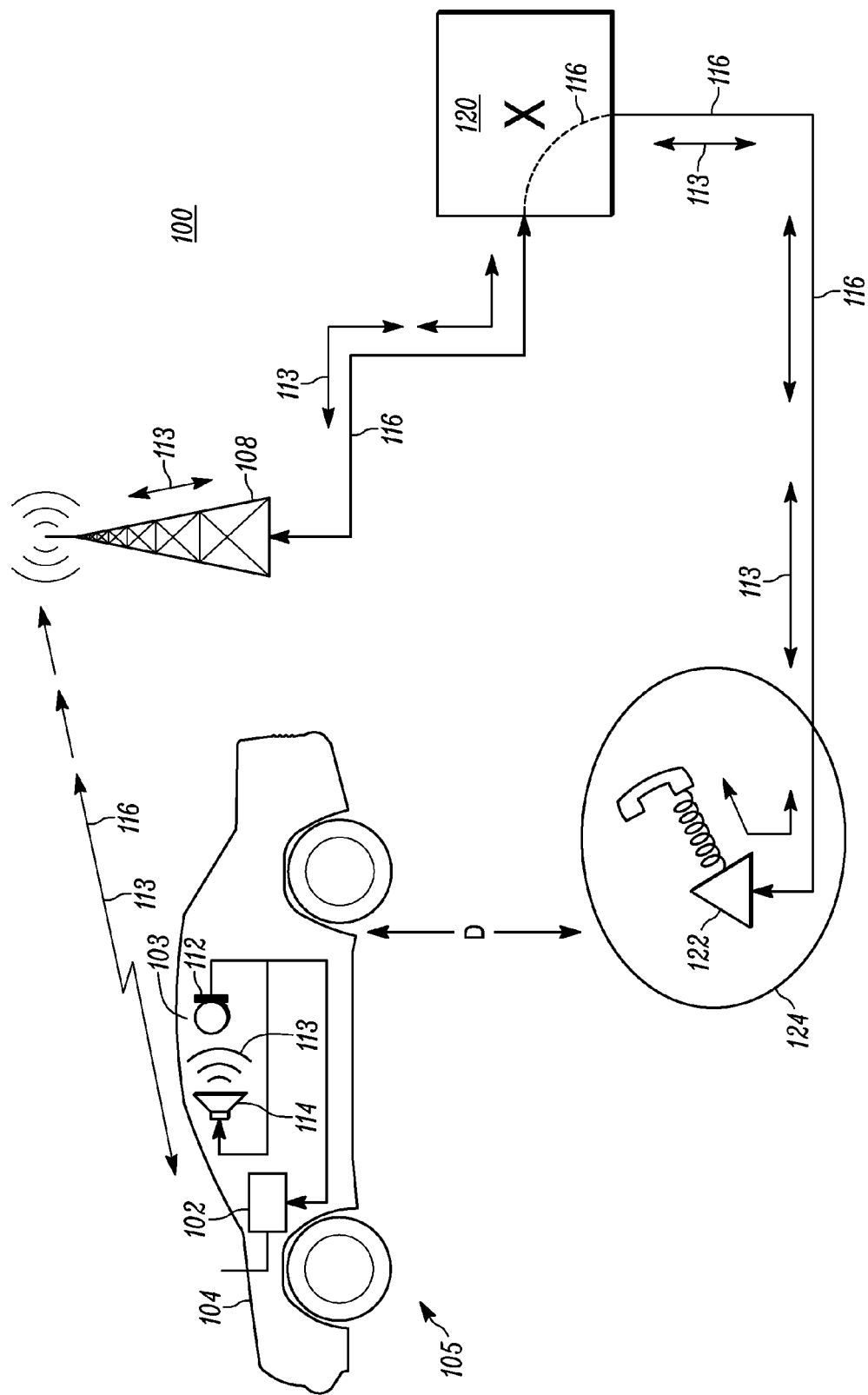
FIG. 1 depicts an example operating environment 100 for embodiments of the invention.

FIG. 1 depicts an example operating environment 100 for embodiments of the invention. The operating environment 100 shown in FIG. 1 comprises a wireless communications device 102, usable by occupants of a passenger compartment or cabin of a vehicle 104. The wireless communications device 102 provides two-way wireless communications that include voice communications, which are facilitated by a wireless network 108 that is compatible with the wireless communications device 102.

In the vehicle 104, the hands-free audio system 105 comprises a microphone 112 or multiple microphones (only one shown) and a loudspeaker 114 or multiple loudspeakers (one shown). The microphone 112 transduces or "picks up" audio-frequency signals from within the passenger compartment or interior 103 of the vehicle 104 and provides electrical signals representing those audio signals to the wireless communications device 102 via a controller 130 for the hands-free audio system 105. The microphone 112 thus picks up road noise, wind noise, and engine noise caused by the vehicle being driven about as well as audio signals output from loudspeakers 114 in the cabin 103, including audio signals that are returned from the far end of a telecommunications path, referred to as "echo."

The loudspeaker 114 portion of the hands-free system 105 receives electrical signals in the audio-frequency range from the wireless communications device 102 via the controller 130 for the hands-free audio system 105. The loudspeaker 114 transduces those electrical signals into sound waves or audio signals 113 that can be heard throughout the passenger compartment 103 of the vehicle 104.

Audio signals 113 picked up by the microphone 112 are converted to electrical signals representing the audio signals. The electrical signals are provided to the wireless communications device 102. The wireless communications device 102 transmits radio frequency signals containing the electrical signals obtained from the microphone to the wireless communications network 108 where they are routed from the network 108 to a conventional telephone switching system 120.

The telephone switching system or network 120 switches or routes the audio signals 113 obtained from the vehicle 104 to a communications device, such as a mobile phone or a conventional telephone handset 122, which is located at a distant location 124, i.e. a location remotely located away from the vehicle 104 at a distance, D. The voice-frequency communications 113 that take place between a person in the vehicle 104 and a person at the distant/remote location 124 thus takes place via a communications link or channel identified in FIG. 1 by reference numeral "116."

Figures 2, 3:
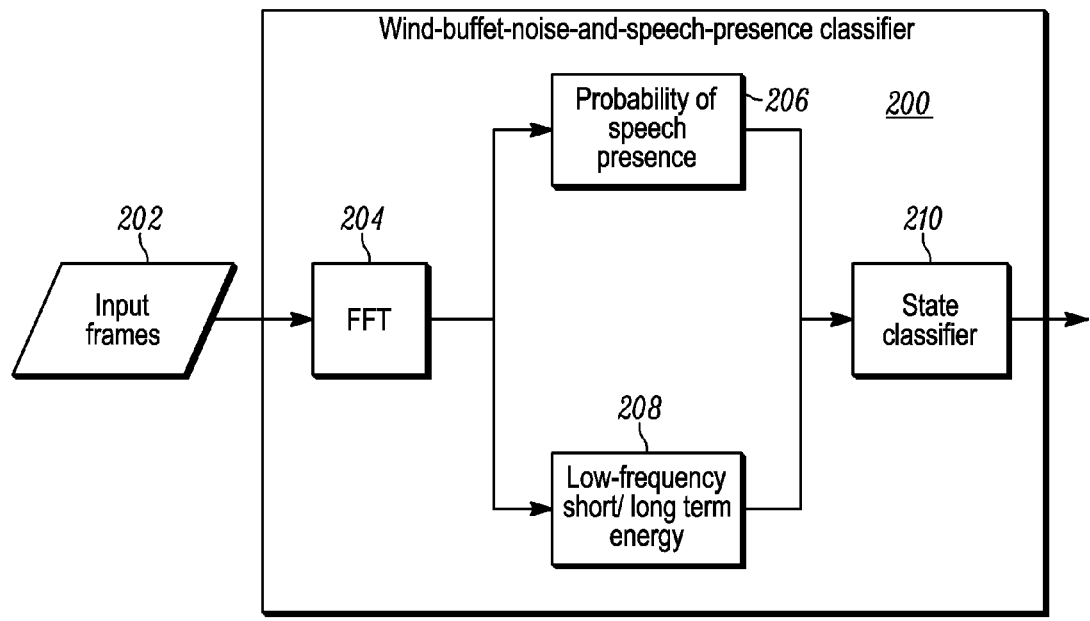
FIG. 2 depicts a block diagram of a wind-buffet-noise-and-speech-presence classifier 200, in accordance with embodiments of the invention.
FIG. 3 depicts a matrix showing the probability values expected for each of the four possible conditions or states.

FIG. 2 depicts a block diagram of a wind-buffet-noise-and-speech-presence classifier 200, in accordance with embodiments of the invention, which may be part of the hands-free audio system 105 of FIG. 1. In various embodiments, the wind-buffet-noise-and-speech-presence classifier 200 comprises one or more computer programs (computer program instructions and data or parameters) stored in a non-transitory memory and executed by a microcontroller or microprocessor. When the program instructions are executed, they cause the processor to perform classification of wind-buffet-noise presence or absence conditions and speech presence or absence conditions on the digital data 212 that represents audio signals detected by the microphone 112, at least some of which may be provided to the microphone 112 by the loudspeaker 114.

The classifier 200 is configured to distinguish between various speech-presence-or-absence and wind-buffet-noise-presence-or-absence conditions. The classifier 200 accepts, as an input, input frames 202 from the microphone 112, or multiple microphones. For the microphone 112, the audio hardware interface comprises a conventional analog-to-digital (A/D) convertor. The A/D converter receives analog voltages and outputs binary numbers that represent the analog voltages.

FFT module 204 performs conventional Fast Fourier Transforms on the input frames 202 and outputs frequency domain representations of the input frames to a probability-of-speech-presence module 206 and a low-frequency-short/long-term-energy module 208.

The probability-of-speech-presence module 206 calculates probability-of-speech presence estimates based on the frequency domain representations of the input frames received from the FFT module. The probability-of-speech-presence module may use any suitable technique, including, but not limited to, calculating a per-frequency probability-of-speech-presence estimate, e.g., as computed in I. Cohen, "Noise spectrum estimation in adverse environments: improved minima controlled recursive averaging," *IEEE Transactions on Speech and Audio Processing*, vol. 11, no. 5, pp. 466-475, September 2003.

The low-frequency-short/long-term-energy module 208 determines an updated long-term average of the low frequency energy (e.g. below 300 Hz, and referred to as the low-frequency "energy floor" or $E_{low,floor}$), which provides a representation of the low frequency energy content during the normal (i.e. no buffet) condition. Additionally, a short-term average of the energy below 300 Hz (referred to as $E_{low}$) is computed and is updated, regardless of the current state. Under certain conditions discussed below, the short-term energy is compared to the energy floor and based at least in part upon the result of the comparison, various transitions among states may occur, as described in more detail below.

A state classifier 210 receives the probability of speech presence estimate information from the probability-of-speech-presence module 206 and the low-frequency short/long term energy information from the low-frequency-short/long-term-energy module 208 and, based on those inputs, and as described in more detail below, determines a presence or absence condition with respect to speech and a presence or absence condition with respect to wind-buffet noise.

The presence or absence conditions with respect to speech and with respect to wind-buffet noise may be used by the hands-free audio system 105 to cancel noise more or less aggressively depending upon whether speech is present or absent and depending upon whether wind-buffet noise is either present or absent.

In accordance with embodiments of the invention, a per-frequency probability of speech presence estimate, e.g. as computed in I. Cohen, "Noise spectrum estimation in adverse environments: improved minima controlled recursive averaging," *IEEE Transactions on Speech and Audio Processing*, vol. 11, no. 5, pp. 466-475, September 2003, may be used to detect wind buffet noise during periods of no speech. This probability varies continuously between 0.0 and 1.0 for each frequency. Because this probability is based on the signal-to-noise ratio (SNR) estimate, wind buffet noise will cause the probability to approach 1.0 (speech) in the lower frequency range. But if there is no speech present, the probability in the higher frequency ranges will accurately be approximately zero. This information may be used for accurately detecting the buffet-no-speech condition.

Specifically, $p_{low}$ may be defined as the average probability in the lower frequency band (e.g. 0-600 Hz) and $p_{high}$ may be defined as the average probability in the higher frequency band (e.g. 600-$f_s$/2 Hz, where $f_s$ is the sampling frequency). The difference between the low frequency and high frequency speech probability presence, may then be computed as $$p_{diff} = p_{low} - p_{high}$$

FIG. 3 depicts a matrix showing the probability values expected for each of the four possible conditions or states, namely, buffet-speech, no-buffet-speech, and buffet-no-speech, and no-buffet, no-speech.

Figure 4:
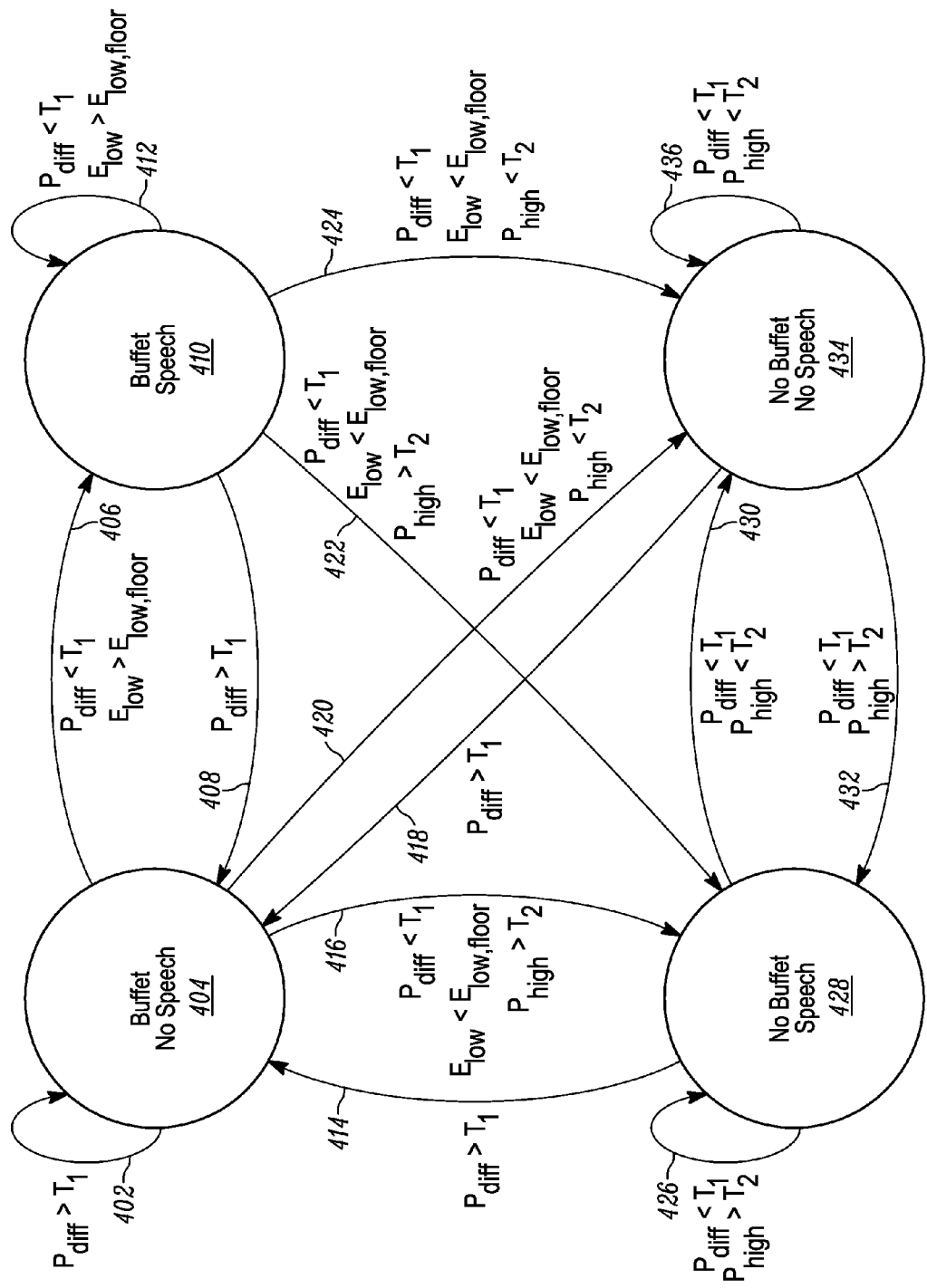
FIG. 4 depicts a state diagram that shows conditions for transitioning between the four states.

FIG. 4 depicts a state diagram that shows conditions for transitioning between the four states.

Using the probability of speech presence estimate, the buffet-no-speech condition 404 can be accurately detected. But the probability of speech presence, by itself, is insufficient for distinguishing between the buffet-speech 410 and either of the no-buffet conditions 428 and 434.

Nevertheless, it can be assumed that, if wind buffeting is occurring, it is occurring during both speech and non-speech segments to help distinguish between the other possible states. That is, the probability difference may be used as the criteria for entering the buffet-no-speech state 404, and then some other information (e.g., low frequency energy) may be used to determine when to transition to the buffet-speech state 410 or one of the no-buffet states 428 and 434 once the probability difference criteria is no longer met.

Due to the nature of wind buffet noise and its concentration in the lower frequencies, the low-frequency energy values can be used to determine which state to transition to from the buffet-no-speech state 404 once the speech probability difference criteria, $P_{diff} > T_1$, is no longer satisfied. If there is still a large amount of low-frequency energy as compared to the no-buffet low-frequency energy, then a transition 406 to the buffet-speech state 410 should happen; otherwise, a transition 416 or 420 to one of the no-buffet states 428 or 434 should happen due to detection of normal low-frequency energy.

Specifically, during the no-buffet-no-speech state 434, a long-term average of the low frequency energy (e.g. below 300 Hz, and referred to as the low-frequency "energy floor" or $E_{low,floor}$) is updated and provides a representation of the low frequency energy of the background noise content during the normal (i.e. no buffet) condition. Additionally, a short-term average of the energy below 300 Hz (referred to as $E_{low}$) is computed and is updated, regardless of the current state. If the current state is either of the buffet states, and the probability difference criteria is no longer met, then the short-term energy is compared to the energy floor. If the short-term energy is larger than the energy floor, a transition 406 to the buffet-speech state 410 happens; otherwise, when the short-term energy is less than or equal to the energy floor, a transition 416 or 420 into one of the no-buffet states (i.e., no-buffet-no-speech 434 or no-buffet-speech 428) occurs based on the probability of speech presence in the high frequency range ($p_{high}$) being either less than, or greater than, respectively, a second threshold, $T_2$.

An embodiment starts in the no-buffet-no-speech state 434 because initially there isn't information yet about the presence of speech or wind buffet noise. From no-buffet-no-speech 434, a transition 418 to the buffet-no-speech state 404 can occur based on the probability of speech presence, which is the main metric used for transitioning into and out of this state. For this transition 418, the other parameters are not used.

So from the no-buffet-no-speech state 434, if wind buffeting is detected, a transition 418 occurs to the buffet-no-speech state 404. Otherwise, there is no transition 436 from the current no-buffet-no-speech state, or, if the probability of speech presence in the high frequency range ($p_{high}$) indicates that speech is likely present, then a transition 432 occurs to the no-buffet-speech state 428.

So, for the purpose of buffet detection, there's really not a whole lot of difference between the no-buffet states 428 and 434 because they're both based on wind buffet noise not being detected. Both transitions 414 or 418 into the buffet-no-speech state may be based on the probability difference threshold, $P_{diff}$ being greater than $T_1$.

There is no transition from the no-buffet-no-speech state 434 directly to the buffet-speech state 410 because the probability of speech presence does not contain enough information for such a transition. When there's buffeting, it looks like speech to the probability estimate. So, apparently there is speech in the lower frequency region. But it is unknown whether there is also speech in the higher frequency region. There might actually be no wind buffeting. There might be only speech.

Once the buffet-no-speech state 404 is entered, wind buffet noise can be aggressively suppressed. As compared to the buffet-speech state, more aggressive noise suppression can be applied in the buffet-no-speech state because there's no speech, which overlaps in frequency range with the wind buffet noise. This aggressive suppression in the buffet-no-speech state 404 could take the form of removing or significantly attenuating all content below a cut-off frequency (i.e., high-pass filtering). However, when trying to remove wind buffet noise when speech is also present, such a high-pass filtering technique would not be desirable since both speech and buffet noise will be removed in the lower frequency region. Therefore, it is useful to distinguish between these 2 buffet states 404 and 410 so that different suppression techniques can be employed. As shown at 402, as long as the difference criteria is met, namely, the low frequency probability of speech presence is significantly higher than the higher frequency probability of speech presence, there is no transition away from the buffet-no-speech state 404. Once that condition is no longer met, a determination may be made with respect to whether: (1) there is still buffeting with speech present; or (2) there is no buffeting, with or without speech. The low frequency short/long-term energy, in conjunction with the probability of speech presence in the higher frequency region, may be used to make that determination.

As shown at 406, a transition from the buffet-no-speech state 404 to the buffet-speech state 410 occurs when the short-term low-frequency energy is greater than the long-term low-frequency energy "floor", which indicates that there is still a lot of low frequency content.

Another transition to a speech state from the buffet-no-speech state 404 is shown at 416, which is a transition to the no-buffet-speech state 428. Transition 416 differs from transition 406 in that the short-term low-frequency energy is lower than then long-term low-frequency energy "floor". For transition 416, there's speech, but the low-frequency energy is lower now than it has been. So that means there was probably buffeting, and now it's gone because the short-term low-frequency energy is lower than the long-term low-frequency energy.

Transitions 406 and 416 are the main transitions from the buffet-no-speech state 404 into one of the speech states 410 and 428. A determination is made whether there is still buffeting or not.

Transition 420 from the buffet-no-speech state 404 to the no-buffet-no-speech state 434 occurs when buffeting stops. So the $p_{diff}$ condition isn't met, but for a different reason this time. The transition 420 is based on $P_{diff}$ no longer exceeding T1, the main threshold that, when $P_{diff}$ exceeds it, no transition occurs from the buffet-no-speech state 404. Then, in addition, the $E_{low}$ is less than the $E_{low,floor}$. But the difference between transition 416 and transition 420 is the probability of speech in the higher-frequency regions. So, if the probability of speech in the higher regions indicates that speech is occurring, the transition 416 into the no-buffet-speech state 428 occurs. If the probability of speech in the higher regions indicates that speech is not occurring, the transition 420 occurs into the no-buffet-no-speech state 434.

The buffet-no-speech state 404 can be entered, via transitions 414, 418, or 408, with a relatively high degree of confidence based on the probability difference, $P_{diff}$, exceeding the threshold, $T_1$. And then the probability in the higher frequency region and the energy in the lower region may be used to transition away from the buffet-no-speech state 404 once the probability difference criterion is no longer met. Then determinations are made regarding whether there is still buffeting and whether there is speech. Two additional inputs may be used, namely, the probability of speech presence in the high frequency region and the short-term low-frequency energy versus the long-term low-frequency energy.

Additional transitions, and non-transitions, are shown in FIG. 4. For example, non-transition 412 remains in the buffet speech state while $P_{diff}<T_1$ and $E_{low}>E_{low,floor}$. Transition 422 occurs when $P_{diff}<T_1$, $E_{low}<E_{low,floor}$, and $P_{high}>T_2$. Transition 424 occurs when $P_{diff}<T_1$, $E_{low}<E_{low,floor}$, and $P_{high}<T_2$. Non-transition 426 occurs when $P_{diff}<T_1$ and $P_{high}>T_2$. And transition 430 occurs when $P_{diff}<T_1$ and $P_{high}<T_2$.

An embodiment typically operates on 10 millisecond buffers. The amount of time that elapses between state transitions could be as low as 10 milliseconds. Design considerations, for example, preventing choppiness, will typically dictate a longer duration for staying in a particular state before transitioning to a next state.

In an embodiment, the duration of the short term average is on the order of 500 milliseconds, and the duration of the long term average is on the order of 5 seconds. Of course other suitable durations could also be used.

In an embodiment, wind buffet noise is considered to prominently occur in the low frequency energy, e.g., below approximately 300 Hz, which was found experimentally to be an effective cutoff. Speech tends to include little or no wind buffet noise energy around 600 Hz and above. Of course, other suitable cutoff frequencies could be used.

The invention claimed is:

1. Apparatus comprising:
   a fast Fourier transform module configured to calculate fast Fourier transforms of digitized speech data;
   a probability of speech presence estimator configured to calculate an average probability of speech presence estimate in a lower frequency band and a probability of speech presence estimate in a higher frequency band based on the fast Fourier transforms of the digitized speech data;
   a low-frequency short-and-long term energy calculator configured to calculate a long-term energy floor based on the fast Fourier transforms of the digitized speech data and a short-term average of the energy below a wind-buffet cutoff frequency;
   a state classifier configured to:
     start in a no-buffet-no-speech state;
     transition to a buffet-no-speech state in response to determining that, for the digitized speech data, a probability difference between the average probability of speech presence estimate in a lower frequency band and the probability of speech presence estimate in a higher frequency band exceeds a first threshold;
     in response to determining that the probability difference no longer exceeds the first threshold, transition from the buffet-no-speech state to a state selected from: buffet-speech, no-buffet-speech, and no-buffet-no-speech; and
     wherein the state transitioned to from the buffet-no-speech state depends, at least in part, upon a difference between the calculated short-term low-frequency energy of the digitized speech data and the long-term energy floor.

2. The apparatus of claim 1, wherein the lower frequency band is from approximately 0 Hz to a speech cutoff frequency, and the higher frequency band is from approximately the speech cutoff frequency through half of a sampling frequency of the digitized speech data.

3. The apparatus of claim 2, wherein the speech cutoff frequency is approximately 600 Hz.

4. The apparatus of claim 1, wherein the wind-buffet cutoff frequency is approximately 300 Hz.

5. The apparatus of claim 1, wherein, the state classifier is further configured to, while in either the buffet-no-speech state or the buffet-speech state, and once the probability difference no longer exceeds the first threshold, if the short-term energy is greater than the long-term energy floor, transition to the buffet-speech state.

6. The apparatus of claim 1, wherein the state classifier is further configured to, while in either the buffet-no-speech state or the buffet-speech state, and once the probability difference no longer exceeds the first threshold, if the short-term energy is less than the energy floor, transition to the no-buffet-no-speech state based on the probability of speech presence in the high frequency range being less than a second threshold.

7. The method of claim 1, wherein the state classifier is further configured to, while in either the buffet-no-speech state or the buffet-speech state, and once the probability difference no longer exceeds the first threshold, if the short-term energy is less than the energy floor, transition to the no-buffet-speech state based on the probability of speech presence in the high frequency range being greater than a second threshold.

8. A method comprising:
   starting in a no-buffet-no-speech state and, while in the no-buffet-no-speech state, calculating an energy floor based on a long-term low-frequency energy of digitized speech data;
   transitioning to a buffet-no-speech state in response to determining that, for the digitized speech data, a probability difference between an average probability of speech presence estimate in a lower frequency band and a probability of speech presence estimate in a higher frequency band exceeds a first threshold;
   calculating a short-term average of the energy below a wind-buffet cutoff frequency;
   in response to determining that the probability difference no longer exceeds the first threshold, transitioning from the buffet-no-speech state to a state selected from: buffet-speech, no-buffet-speech, and no-buffet-no-speech; and
   wherein the state transitioned to from the buffet-no-speech state depends, at least in part, upon a difference between the calculated short-term low-frequency energy of the digitized speech data and the energy floor.

9. The method of claim 8, wherein the lower frequency band is from approximately 0 Hz to a speech cutoff frequency, and the higher frequency band is from approximately the speech cutoff frequency through half of a sampling frequency of the digitized speech data.

10. The method of claim 9, wherein the speech cutoff frequency is approximately 600 Hz.

11. The method of claim 8, wherein the wind-buffet cutoff frequency is approximately 300 Hz.

12. The method of claim 8, wherein, while in either the buffet-no-speech state or the buffet-speech state, and once the probability difference no longer exceeds the first threshold, if the short-term energy is greater than the energy floor, transitioning to the buffet-speech state.

13. The method of claim 8, wherein while in either the buffet-no-speech state or the buffet-speech state, and once the probability difference no longer exceeds the first threshold, if the short-term energy is less than the energy floor, transitioning to the no-buffet-no-speech state based on the probability of speech presence in the high frequency range being less than a second threshold.

14. The method of claim 8, wherein while in either the buffet-no-speech state or the buffet-speech state, and once the probability difference no longer exceeds the first threshold, if the short-term energy is less than the energy floor, transitioning to the no-buffet-speech state based on the probability of speech presence in the high frequency range being greater than a second threshold.

15. A non-transient computer readable medium having stored thereon computer-executable instructions, that when executed by a processor, perform operations comprising:
  starting in a no-buffet-no-speech state and, while in the no-buffet-no-speech state, calculating an energy floor based on a long-term low-frequency energy of digitized speech data;
  transitioning to a buffet-no-speech state in response to determining that, for the digitized speech data, a probability difference between an average probability of speech presence estimate in a lower frequency band and a probability of speech presence estimate in a higher frequency band exceeds a first threshold;
  calculating a short-term average of the energy below a wind-buffet cutoff frequency;
  in response to determining that the probability difference no longer exceeds the first threshold, transitioning from the buffet-no-speech state to a state selected from: buffet-speech, no-buffet-speech, and no-buffet-no-speech; and
  wherein the state transitioned to from the buffet-no-speech state depends, at least in part, upon a difference between the calculated short-term low-frequency energy of the digitized speech data and the energy floor.

16. The computer-readable medium of claim 15, wherein the lower frequency band is from approximately 0 Hz to a speech cutoff frequency, and the higher frequency band is from approximately the speech cutoff frequency through half of a sampling frequency of the digitized speech data.

17. The computer-readable medium of claim 16, wherein the speech cutoff frequency is approximately 600 Hz.

18. The computer-readable medium of claim 15, wherein the wind-buffet cutoff frequency is approximately 300 Hz.

19. The computer-readable medium of claim 15, wherein, while in either the buffet-no-speech state or the buffet-speech state, and once the probability difference no longer exceeds the first threshold, if the short-term energy is greater than the energy floor, transitioning to the buffet-speech state.

20. The computer-readable medium of claim 15, wherein while in either the buffet-no-speech state or the buffet-speech state, and once the probability difference no longer exceeds the first threshold, if the short-term energy is less than the energy floor, transitioning to the no-buffet-no-speech state based on the probability of speech presence in the high frequency range being less than a second threshold.

21. The computer-readable medium of claim 15, wherein while in either the buffet-no-speech state or the buffet-speech state, and once the probability difference no longer exceeds the first threshold, if the short-term energy is less than the energy floor, transitioning to the no-buffet-speech state based on the probability of speech presence in the high frequency range being greater than a second threshold.

* * * * *